(12) United States Patent
Minatti et al.

(10) Patent No.: US 12,539,744 B2
(45) Date of Patent: Feb. 3, 2026

(54) VEHICLE ROOF AND VEHICLE

(71) Applicant: Bayerische Motoren Werke Aktiengesellschaft, Munich (DE)

(72) Inventors: Johann Minatti, Munich (DE); Alexander Walter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 374 days.

(21) Appl. No.: 18/010,003

(22) PCT Filed: Jun. 18, 2021

(86) PCT No.: PCT/EP2021/066549
§ 371 (c)(1),
(2) Date: Dec. 13, 2022

(87) PCT Pub. No.: WO2021/259771
PCT Pub. Date: Dec. 30, 2021

(65) Prior Publication Data
US 2023/0249521 A1   Aug. 10, 2023

(30) Foreign Application Priority Data

Jun. 26, 2020   (DE) .................. 10 2020 116 910.8

(51) Int. Cl.
*B60J 7/00*   (2006.01)
*B60H 1/26*   (2006.01)
(Continued)

(52) U.S. Cl.
CPC ............ *B60J 7/0015* (2013.01); *B60H 1/262* (2013.01); *B60J 1/2075* (2013.01); *B60J 7/22* (2013.01); *B62D 25/06* (2013.01); *B62D 25/07* (2013.01)

(58) Field of Classification Search
CPC ....... B62D 25/06; B60J 7/1642; B60J 7/0015; B60H 1/262; B60H 1/30; B60H 1/265; B60H 1/267
(Continued)

(56) References Cited

U.S. PATENT DOCUMENTS 2,094,932 A * 10/1937 Swan ..................... B60J 7/0015
160/264
2003/0162490 A1   8/2003 Klesing et al.
(Continued)

FOREIGN PATENT DOCUMENTS

CN   1680130 A   10/2005
CN   101112865 A   1/2008
(Continued)

OTHER PUBLICATIONS

DE102007025145 Text (Year: 2007).*
(Continued)

*Primary Examiner* — Dennis H Pedder
(74) *Attorney, Agent, or Firm* — Crowell & Moring LLP

(57) ABSTRACT

A vehicle roof has a roof opening and a planar, transparent or translucent, roof element which seals the roof opening and is permanently connected to a roof frame of the vehicle roof. A ventilation device is integrated in the roof element and has a ventilation flap. The ventilation flap can be pivoted between a closed position in which the ventilation flap seals a ventilation opening and an open position in which the ventilation flap exposes the ventilation opening. A vehicle is equipped with a vehicle roof of this type.

20 Claims, 4 Drawing Sheets

(51) Int. Cl.
  *B60J 1/20* (2006.01)
  *B60J 7/22* (2006.01)
  *B62D 25/06* (2006.01)
  *B62D 25/07* (2006.01)

(58) Field of Classification Search
  USPC ...... 296/215, 216.02, 3, 180.1; 454/70, 129, 454/130.136, 137, 138, 162
  See application file for complete search history.

(56) References Cited

U.S. PATENT DOCUMENTS

| | | |
|---|---|---|
| 2005/0218703 A1 | 10/2005 | Aoki et al. |
| 2008/0023155 A1 | 1/2008 | Beierl et al. |
| 2014/0054932 A1 | 2/2014 | Kanai |
| 2019/0283557 A1 | 9/2019 | Geurts et al. |

FOREIGN PATENT DOCUMENTS

| | | | |
|---|---|---|---|
| CN | 103625252 A | 3/2014 | |
| DE | 102 22 164 C1 | 3/2003 | |
| DE | 102 41 821 A1 | 3/2004 | |
| DE | 103 22 092 A1 | 12/2004 | |
| DE | 102007025145 A1 * | 11/2007 | ............ B60J 7/0015 |
| DE | 10 2007 012 486 A1 | 9/2008 | |
| EP | 1 477 393 A2 | 11/2004 | |
| EP | 3 539 805 A1 | 9/2019 | |

OTHER PUBLICATIONS

International Search Report (PCT/ISA/210) issued in PCT Application No. PCT/EP2021/066549 dated Sep. 24, 2021 with English translation (four (4) pages).

German-language Search Report issued in German Application No. 10 2020 116 910.8 dated Jan. 20, 2021 with partial English translation (10 pages).

English translation of Chinese-language Office Action issued in Chinese Application No. 202180037299.6 dated Feb. 8, 2025 (5 pages).

English translation of Chinese-language Office Action issued in Chinese Application No. 202180037299.6 dated Jul. 30, 2025 (6 pages).

* cited by examiner

VEHICLE ROOF AND VEHICLE

BACKGROUND AND SUMMARY

The present invention relates to a vehicle roof, having a roof opening and a planar, transparent or translucent roof element, which closes the roof opening and is connected to a roof frame of the vehicle roof in a fixed manner. Furthermore, the invention relates to a vehicle with such a vehicle roof.

Vehicle roofs include, on the one hand, roof systems with an opening function and, on the other, roof systems with glass panels which are adhesively bonded in a fixed manner, without an opening function. In roof systems with a glass panel which is adhesively bonded in a fixed manner, the glass panel may be combined with a screen or a crescent-shaped cutout in which a roof antenna may be accommodated.

Roof systems with an opening function are used to ventilate the vehicle interior. Such roof systems have a glass cover, which closes the roof opening and can be moved to open the roof opening, a sun shade and an electric drive for moving the glass cover. Although roof opening systems reliably ventilate the interior, they have the disadvantage that a complex and expensive mechanism is required to move the cover element and, moreover, the light transmittance and the spatial effect are limited compared to a glass panel which is adhesively bonded in a fixed manner.

Roof systems with glass panels which are adhesively bonded in a fixed manner, without an opening function, offer good light transmittance and a good spatial effect. Such a roof system is known, for example, from DE 10 2007 012 486 A1, which discloses a vehicle roof with a fixed glass element, which has a panel surrounded by a holding frame and an antenna element connected to the fixed glass element. A cutout, in which an antenna element is arranged, is provided on an edge region of the panel.

However, the disadvantage with roof systems with glass panels which are adhesively bonded in a fixed manner is that there is no option for ventilating the interior.

To avoid this disadvantage, DE 39 24 036 C1 proposes a vehicle roof with a vent flap, which is integrated in a fixed roof and which is pivotable about a pivot axis located at or near to its rear edge—with respect to the direction of travel—between a closed position and a ventilating position, in which the front edge of the vent flap is lowered below the roof surface, wherein the vent flap, in the ventilating position, is arranged as a whole in the front part of the roof, which adjoins the upper edge of the front window and is located in front of the head space of the driver or passenger.

The present invention is based on the object of providing a vehicle roof and a vehicle which have better light transmittance and a good spatial effect, whilst ensuring ventilation of the vehicle interior.

To achieve the object, a vehicle roof and a vehicle having the features of the independent claims are proposed. Advantageous configurations of the vehicle roof are the subject matter of the dependent claims.

According to one aspect, a vehicle roof is proposed, which has a roof opening and a planar, transparent or translucent roof element, which closes the roof opening and which is connected to a roof frame of the vehicle roof in a fixed manner, wherein a ventilation device, which has a ventilation flap, is integrated in the roof element, and wherein the ventilation flap is pivotable between a closed position, in which the ventilation flap closes a ventilation opening, and an open position, in which the ventilation flap opens the ventilation opening.

The combination of a planar, transparent or translucent roof element, which is connected to the roof frame of the vehicle in a fixed manner, and a ventilation flap results in good light transmittance and greater light penetration into the vehicle interior, and therefore a good spatial effect, on the one hand, and, on the other, the ventilation flap enables ventilation of the vehicle interior and therefore temperature-regulation within the vehicle interior. Therefore, in the open position, air may exit the vehicle interior and therefore support the climate control. In addition, with the ventilation device, new climate control systems in the roof region and combinations with conventional climate control systems are possible. Moreover, the integration of the vehicle roof in existing vehicle architectures is facilitated due to the small dimensions.

In an advantageous configuration, the air exchange takes place via air channels between the ventilation device and the interior or via a direct connection to the interior. The air channels are advantageously arranged laterally between the ventilation device and the vehicle interior.

In an advantageous configuration, the shape of the ventilation flap defines the shape of the ventilation opening.

The vehicle may be an electric vehicle or a hybrid vehicle, which has an electric drive machine, for example an electric motor, which is supplied with electric energy via a battery. Furthermore, the vehicle may have an internal combustion engine as a drive machine.

The roof frame may be made of metal or a fiber-reinforced plastic material. The roof opening is incorporated in the roof frame. The roof element and the roof frame together form the vehicle roof.

The roof element may be materially bonded, in particular adhesively bonded, to the roof frame. In an advantageous configuration, the roof element comprises a large proportion of the vehicle roof. The roof element may be equipped with a circumferential coating. The coating may be a black print.

In an advantageous configuration, the ventilation device may be connected to the roof element with form fit, force fit and/or in a materially bonded manner. Therefore, the ventilation device may be screwed and/or adhesively bonded to the roof frame and/or the roof element.

The ventilation flap is advantageously pivotable about a pivot axis, which is preferably formed in the ventilation device. The ventilation flap may be mechanically or electrically pivotable, in particular, about the pivot axis. The pivot axis is advantageously a horizontal axis. The pivot axis furthermore advantageously extends in the transverse vehicle direction. The pivot axis is advantageously formed by a swivel joint, which is connected to the ventilation device or the roof element in a fixed manner.

In an advantageous configuration, the ventilation flap is pivotable into the open position in such a way that an edge of the ventilation flap is lowered below a roof surface of the vehicle roof, or in such a way that the edge of the ventilation flap is raised above the roof surface of the vehicle roof. It is thus possible that the ventilation flap may be opened downwards or upwards. In an advantageous configuration, depending on a speed of the vehicle, the ventilation flap may be pivoted either downwards, i.e. the edge of the ventilation flap is lowered below the roof surface of the vehicle roof, or upwards, i.e. the edge of the ventilation flap is raised above the roof surface of the vehicle roof. The roof surface may form the roof element or a screen.

In an advantageous configuration, the ventilation flap is pivotable in such a way that the ventilation opening faces the roof element or faces away from the roof element. If the ventilation opening faces the roof element, the ventilation opening points rearwards in the longitudinal vehicle direction, i.e. in the direction of travel. If the ventilation opening faces away from the roof element, then the ventilation opening points forwards in the longitudinal vehicle direction, i.e. in the direction of travel.

In an advantageous configuration, the ventilation device is integrated in the roof element such that it is adjacent to a front window or a rear window. If the ventilation device is integrated in the roof element such that it is adjacent to a front window, then the ventilation flap is situated in the region with the greatest negative pressure on the vehicle roof, which is usually behind the front window. In this case, the air is sucked out of the vehicle interior. If the ventilation device is integrated in the roof element such that it is adjacent to a rear window, then the ventilation flap is situated in a region with the relative positive pressure, i.e. the ventilation flap is situated behind the glass roof as seen in the longitudinal vehicle direction. In this case, outside air is conducted into the vehicle interior. A relative positive pressure may also be generated in that the ventilation opening is forward-facing in the longitudinal vehicle direction and the vehicle travels at high speed. This results in a so-called dynamic pressure, which conducts outside air in to the vehicle interior.

In an advantageous configuration, the ventilation device is designed in such a way that the ventilation opening points forwards in the longitudinal vehicle direction, i.e. in the direction of travel, and, depending on a speed of the vehicle, the edge of the ventilation flap is lowered below the roof surface of the vehicle roof in order to generate a dynamic pressure, or in such a way that the edge of the ventilation flap is raised above the roof surface of the vehicle roof in order to generate a negative pressure.

In an advantageous configuration, the ventilation device is integrated in a cutout in the roof element and/or in a cutout in a screen. The shape of the cutout defines the shape of the ventilation flap and therefore the shape of the ventilation opening. The cutout may be crescent-shaped or parabolic. The ventilation device is advantageously inserted into the cutout in the roof element, wherein the ventilation device is connected to the roof element and/or the roof frame.

In an advantageous configuration, the ventilation device has a drive device, which is connected to the ventilation flap in order to pivot the ventilation flap between the closed position and the open position. The drive device for actuating the ventilation flap may be an electric drive, which controls a motion link on the ventilation flap via a lever, for example.

In an advantageous configuration, the ventilation flap is coupled to the drive device via a lever device. The lever device transfers a movement and/or a force from the drive device to the ventilation flap in order to pivot this latter into the open position or closed position. Therefore, the lever device serves as a transmission. The lever device may be connected to the ventilation flap via a swivel joint.

In an advantageous configuration, the ventilation device has a housing, within which the ventilation flap is mounted such that it is pivotable about a pivot axis. The housing may be materially bonded, in particular adhesively bonded, to the roof element and/or the roof frame of the vehicle roof. The housing may have air channels, which enable an air exchange between the vehicle interior and the environment.

In an advantageous configuration, a water channel is integrated in the housing. In the event of rain, the water may be conducted away via the water channel so that it is prevented from penetrating into the vehicle interior. The water channel advantageously surrounds the housing. In an advantageous configuration, the water channel extends below a seal between the ventilation flap and a roof shell, which may be the cover element or a screen. The penetrating water is advantageously conducted outwards via discharge tubes.

In an advantageous configuration, the ventilation flap has cover plates. The cover plates ensure improved aeroacoustics. The cover plates may be connected to the ventilation flap in one piece, from a single material, or the cover plates may be separate parts, which are connected to the ventilation flap with form fit, force fit and/or in a materially bonded manner. The cover plates are advantageously arranged laterally on the ventilation flap.

In an advantageous configuration, the roof element is designed as a glass panel. Greater light penetration into the vehicle interior and therefore a good spatial effect are thus achieved.

In an advantageous configuration, a roller blind is provided, wherein at least one portion of the roller blind is equipped with a net fabric. The net fabric serves as a ventilation slot so that an air exchange between the environment and the vehicle interior may take place when the roller blind is closed and the ventilation flap is open. In an advantageous configuration, the vehicle roof has a support-bow holder, into which a support bow fastened to the roller blind may be driven.

The support-bow holder is advantageously designed in such a way that the roller blind may be driven rearwards to the extent that the net fabric serving as a vent zone becomes exposed. The net fabric may also be referred to as a vent insert.

In a further advantageous embodiment, a roof liner is provided below the roof element, wherein the ventilation flap is arranged partly or completely above the roof liner.

The roof liner preferably covers at least a sub-region of the roof element towards the vehicle interior. In particular, the roof liner covers at least an edge region of the roof element. By way of example, the roof liner covers at least an edge region which adjoins the front window, i.e. a front edge region of the roof element as seen in the direction of travel.

The air exchange between the ventilation device and the interior advantageously takes place via an opening in the roof liner or a gap between an end region of the roof liner and the roof element. A solids collection device, such as a net fabric, a grille, a rack and/or a mesh may be provided in the opening in the roof liner or in the gap between the end region of the roof liner and the roof element to prevent solids of a certain size from entering the interior. An end region of the roof liner is, for example, a forward-facing end region, a rearward-facing end region or a sideward-facing end region.

In the configuration with the roller blind, the roller blind, in particular a roller-blind winding axis, is arranged between the roof liner and the roof element. In this case, an air exchange may advantageously take place through a gap between the support-bow holder (in the rearward-facing end region of the roof liner, within a cutout in the roof liner) and the roof element.

The gap between the roof liner and the roof element may also be situated at the forward-facing end region of the roof liner, in the region of the front window.

According to a further aspect, a vehicle having a vehicle roof of this type is proposed.

A vehicle roof, a vehicle and further features and advantageous will be explained in more detail below with the aid of exemplary embodiments which are illustrated schematically in the figures.

DETAILED DESCRIPTION OF THE DRAWINGS

Figure 1:
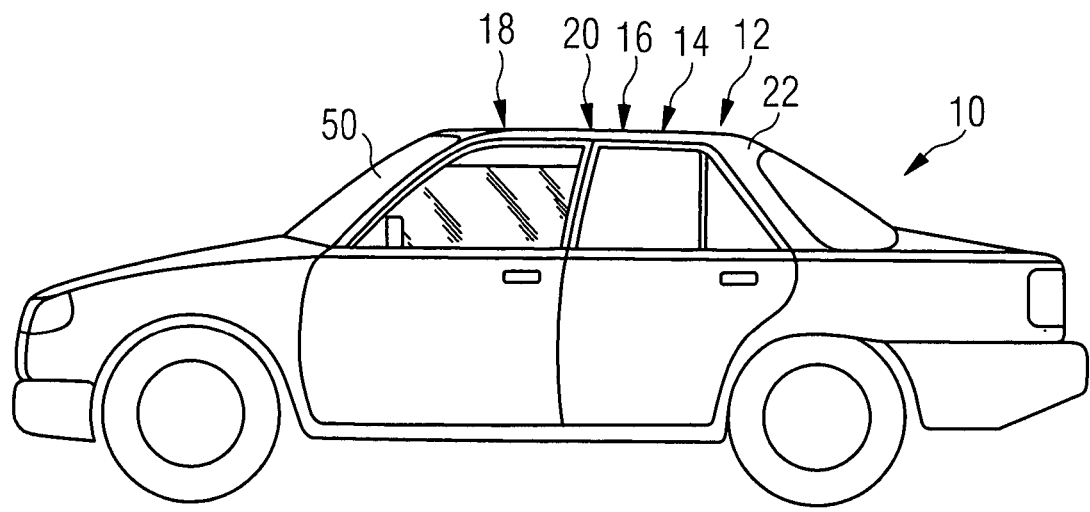
FIG. 1 is a vehicle with a vehicle roof.
Figure 2:
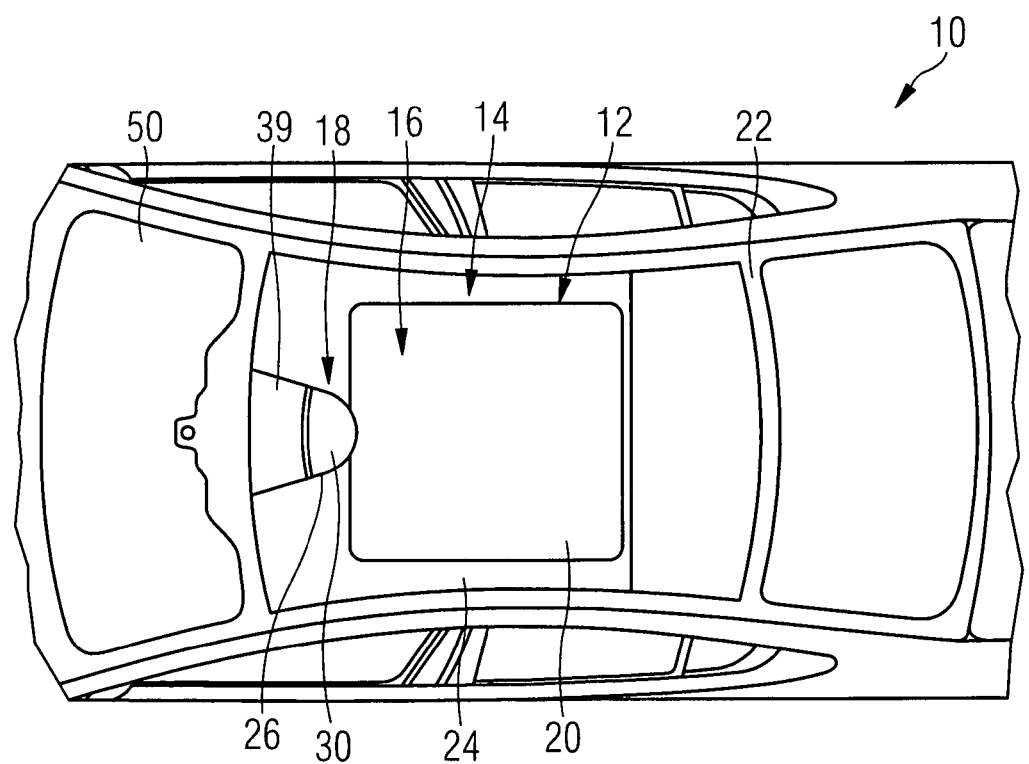
FIG. 2 is a plan view of a vehicle roof with a ventilation device according to a first embodiment.
Figure 3:
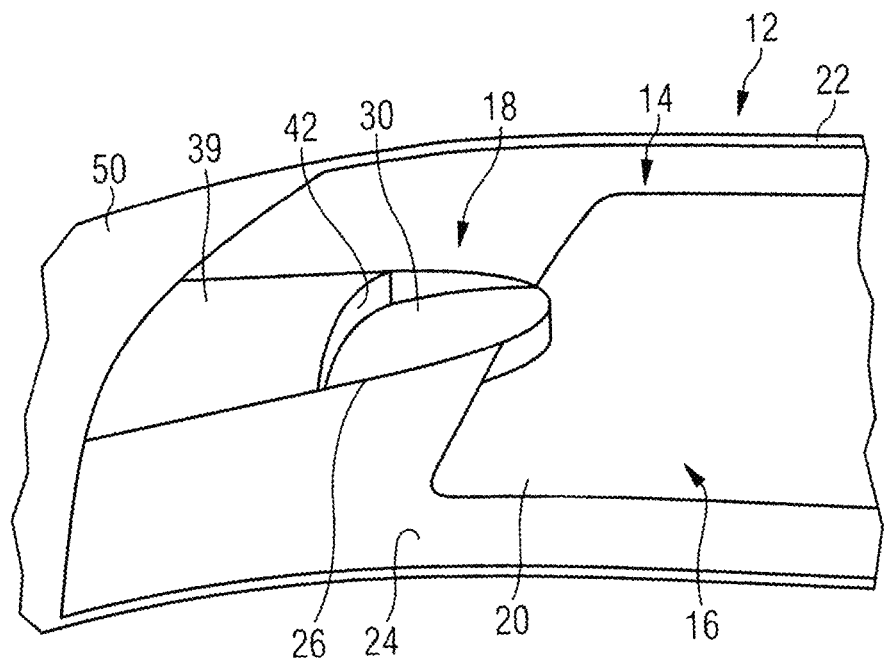
FIG. 3 is a perspective illustration of the vehicle roof with the ventilation device according to the first embodiment, wherein a ventilation flap of the ventilation device is pivoted downwards.

FIG. 1 shows a vehicle 10, which has a vehicle roof 12. The vehicle 10 may be a motor vehicle with an internal combustion engine or a drive machine designed as an electric motor.

As can be seen in FIGS. 2 to 6, the vehicle roof 12 has a roof opening 14, a planar, transparent or translucent roof element 16 and a ventilation device 18.

The planar, transparent or translucent roof element 16 is designed as a glass panel 20 and closes the roof opening 14 in that it is connected to a roof frame 22 of the vehicle roof 12 in a fixed manner, in particular adhesively bonded to the roof frame 22. As can be seen in particular in FIGS. 2 and 3, the glass panel is equipped with a circumferential frame 24, which is a black print.

The ventilation device 18 is integrated in a parabolic cutout 26 of the glass panel 20 and has a housing 28, a ventilation flap 30 which is pivotably arranged within the housing 28, a lever device 32 and a drive device 34.

The housing 28 is materially bonded, in particular adhesively bonded, to the roof frame 22. The housing 28 moreover has a water channel 36, which surrounds the housing 28 and is arranged, with a seal 38, between the ventilation flap 30 and a screen 39 covering the cutout 26. The water which is transported away via the water channel 36 is conducted outwards via discharge tubes (not illustrated), which may be designed as hoses.

The seal 38 is connected to the ventilation flap 30 and surrounds this. The seal 38 prevents water from penetrating between the glass panel 20, the screen 39 and the ventilation flap 30. The seal 38 is made of an elastic material, for example an elastomer or EPDM.

The ventilation flap 30 may be made of metal, plastic material or glass and, as described above, is pivotably arranged within the housing 28. As can be seen in particular in FIG. 4, the ventilation flap 30 pivots about a pivot axis 41 or swivel axis. The pivot axis 41 is arranged at a rear end 40 of the ventilation flap 30 and is realized via a swivel joint (not illustrated), which is connected to the housing 28.

For pivoting purposes, the ventilation flap 30 is connected to the drive device 34 via the lever device 32. The drive device 34 may be an electric motor. The lever device 32 is designed as a lever 48, which is connected to the drive device 34, wherein the lever 48 transfers a movement of the drive device 34 to the ventilation flap 30 so that the ventilation flap is pivoted about the pivot axis 41.

Figure 4:
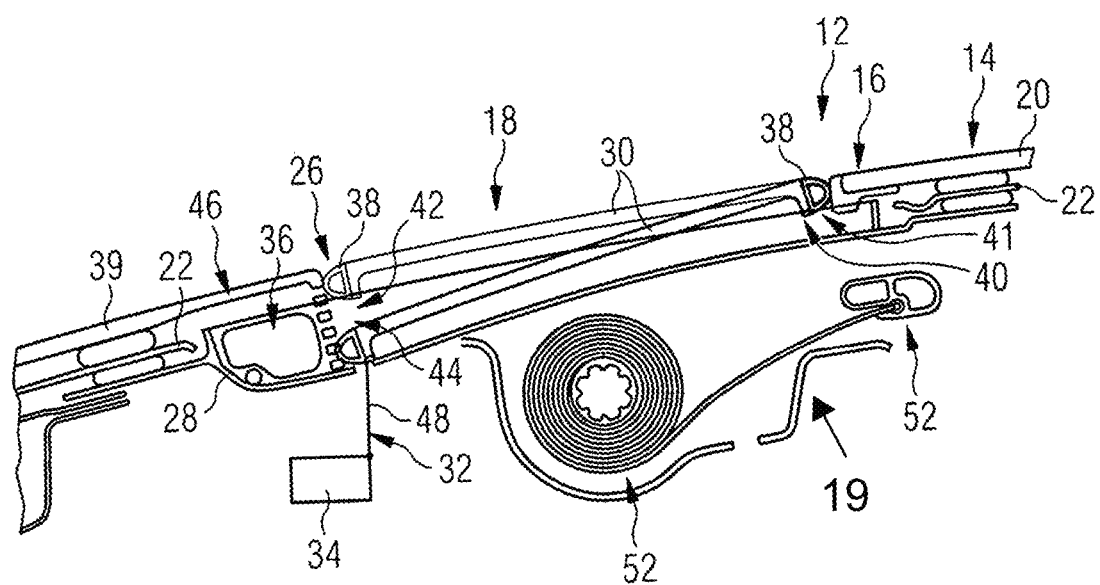
FIG. 4 is a cross section through the ventilation device of FIG. 3 along the line IV-IV with the ventilation flap in a closed position and an open position.

As can be seen in particular in FIG. 4, the ventilation flap 30 pivots between a closed position, in which the ventilation flap 30 closes a ventilation opening 42, and an open position, in which the ventilation flap 30 opens the ventilation opening 42. In the open position, a front edge 44 of the ventilation flap 30 is lowered below a roof surface 46 of the vehicle roof 12.

In the embodiment illustrated in FIGS. 1 to 6, the ventilation device 18 is arranged adjacent to a front window 50 or windshield and is therefore situated in the region with the greatest negative pressure on the vehicle roof 12. Air is thus sucked out of a vehicle interior in the open position of the ventilation flap 30. To this end, the air flows laterally into the housing 28 through a ventilation grille (not illustrated) and outwards via the ventilation opening 42.

Figure 5:
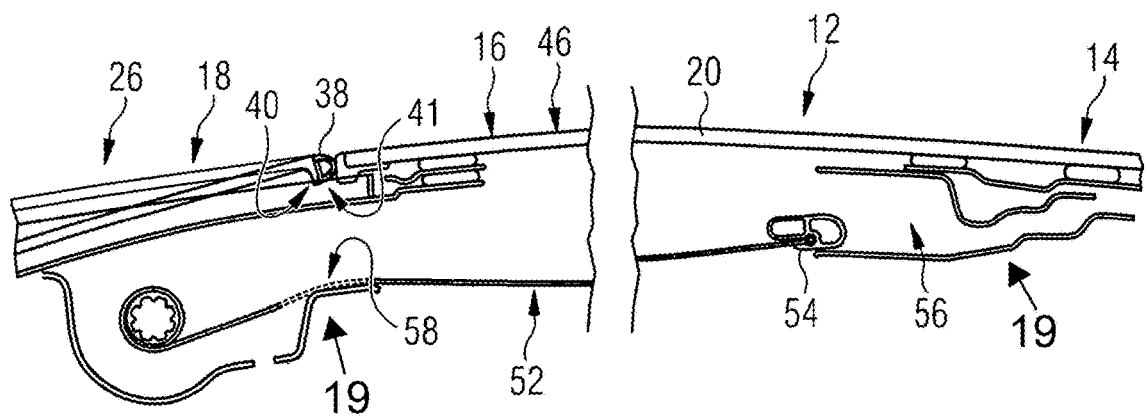
FIG. 5 is a cross section through a ventilation device according to the first embodiment with a roller blind with a vent insert and a support-bow holder, wherein the vent insert is covered.
Figure 6:
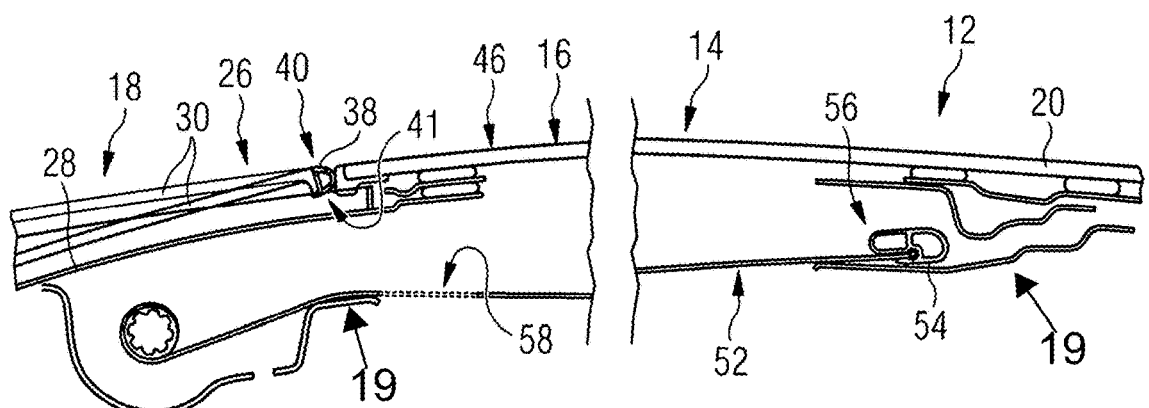
FIG. 6 is a cross section through a ventilation device according to the first embodiment with a roller blind with a vent insert and a support-bow holder, wherein the vent insert is exposed.

As can moreover be seen in FIGS. 4 to 6, for protection against solar radiation and as a barrier against wind, the vehicle roof 12 has an electrically driven roller blind 52, which is equipped at one end with a support bow 54 which is guided in guide rails (not illustrated). In the closed position (shown in FIGS. 5 to 6) of the roller blind 52, the support bow is guided into a support-bow holder 56 formed in the vehicle roof 12. In order to enable an air exchange between the vehicle interior and the environment when the roller blind 52 is closed and the ventilation flap 30 is open, the roller blind 52 has a vent insert 58 in the form of netting or a net fabric. So that an air exchange between the interior and the environment takes place effectively, the support-bow holder 56 is designed in such a way that the support bow 54 may move further rearwards than is shown in FIG. 6, so that the vent insert 58 is no longer covered and points into the vehicle interior. A roof liner 19 is arranged below the roller blind 52. The roof liner 19 extends from a front window 50 to a region of the support-bow holder 56 and along a roof side frame and over a region in front of a rear window. An gap for air exchange with the vehicle interior is therefore provided between the support-bow holder 56 and the roof element 16.

Further embodiments of the vehicle roof 12 are explained below, wherein the same reference signs are used for similar or functionally similar parts.

Figure 7:
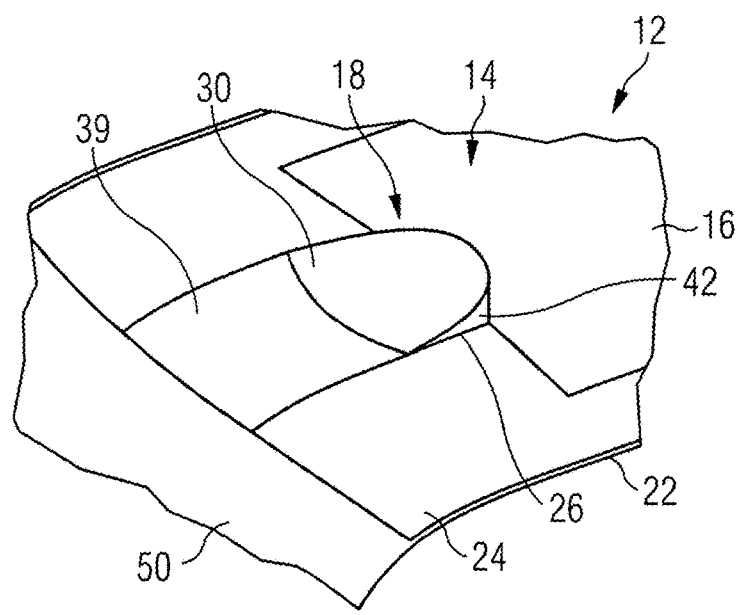
FIG. 7 is a perspective illustration of a ventilation device according to a second embodiment, wherein the ventilation flap of the ventilation device is pivoted upwards.
Figure 8:
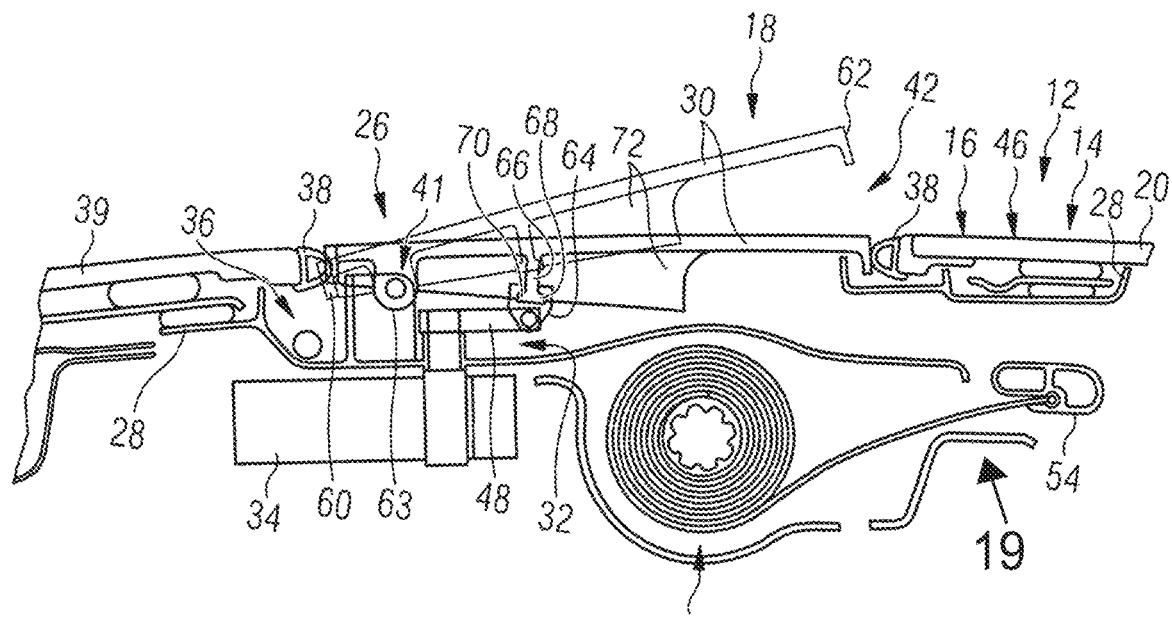
FIG. 8 is a cross section through the ventilation device of FIG. 7 along the line VII-VII with the ventilation flap in a closed position and an open position.

In FIGS. 7 and 8, a second embodiment of the ventilation device 18 is shown, which differs from the first embodiment in that a rear edge 62 of the ventilation flap 30 is raised above the roof surface 46 in the open position so that the ventilation opening 42 points rearwards in the longitudinal vehicle direction, i.e. away from the front window 50.

In order to raise the rear edge 62 above the roof surface 46, the pivot axis 41 is arranged in a front end 60 of the ventilation flap 30. As can be seen in FIG. 8, the pivot axis 41 is a swivel joint 63, which is connected to the housing 68 in a fixed manner.

In order to pivot the ventilation flap 30 between the open and closed position, the lever device 32 has a lever 48, which is connected to a web 66 protruding from the ventilation flap 30, via a receiving element 64, which is rotatably mounted on the lever 48. The lever 48 is connected to the drive device 34, which is designed as an electric motor. To connect the receiving element 64 to the web 66, the receiving element 64 has a T-shaped groove 68, in which a corresponding T-shaped end portion 70 of the web 66 engages.

To improve the aeroacoustics, the ventilation flap 30 is equipped with lateral cover plates 72.

In the exemplary embodiment shown in FIGS. 7 and 8, the seal 38 is connected to the glass panel 20.

Figure 9:
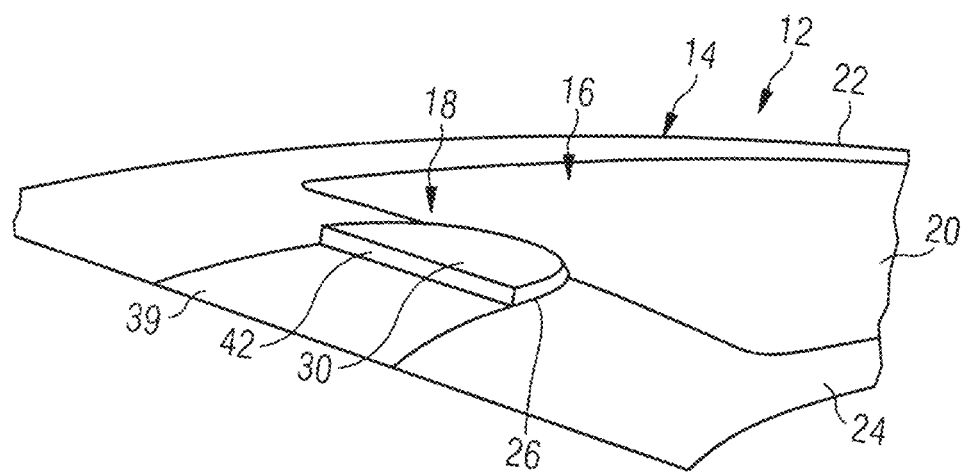
FIG. 9 is a perspective illustration of a vehicle roof with a ventilation device according to a third embodiment.

In FIG. 9, a third embodiment of the vehicle roof 12 is shown, which differs from the other embodiments in that the ventilation flap 30 is pivotably arranged within the housing 28 in such a way that, in the open position, the ventilation opening 42 points forwards in the longitudinal vehicle direction, i.e. in the direction of travel. A dynamic pressure is thus generated at high speed so that the outside air is conducted into the vehicle interior.

In an embodiment (not illustrated) of the vehicle roof 12, the ventilation device 18 is designed in such a way that the ventilation opening 42 points forwards in the longitudinal vehicle direction, i.e. in the direction of travel, and in such a way that, depending on a speed of the vehicle, the front edge 44 of the ventilation flap 30 is lowered below the roof surface 46 of the vehicle roof 12 in order to generate a dynamic pressure, or in such a way that the front edge 44 of the ventilation flap 30 is raised above the roof surface 46 of the vehicle roof 12 in order to generate a negative pressure.

In a further embodiment (not illustrated), the ventilation deice 18 is integrated in the roof element 16 such that it is adjacent to a rear window. The ventilation flap 30 is thus situated in a region with the relative positive pressure, i.e. the ventilation flap 30 is situated behind the glass roof, as seen in the longitudinal vehicle direction. In this case, outside air is conducted into the vehicle interior.

The combination of a roof element 16, which is designed as a glass panel 20 and is connected to the roof frame 22 in a fixed manner, and a ventilation flap 30 results in good light transmittance and greater light penetration into the vehicle interior, and therefore a good spatial effect, on the one hand, and, on the other, the ventilation flap 30 enables ventilation of the vehicle interior and therefore temperature-regulation within the vehicle interior. Therefore, in the open position, air may exit the vehicle interior or flow into the vehicle interior and therefore support the climate control.

LIST OF REFERENCE SIGNS

10 Vehicle
12 Vehicle roof
14 Roof opening
16 Roof element
18 Ventilation device
20 Glass panel
22 Roof frame
24 Frame
26 Cutout
28 Housing
30 Ventilation flap
32 Lever device
34 Drive device
36 Water channel
38 Seal
39 Screen
40 Rear end
41 Pivot axis
42 Ventilation opening
44 Front edge
46 Roof surface
48 Lever
50 Front window
52 Roller blind
54 Support bow
56 Support-bow holder
58 Vent inert
60 Front end
62 Rear edge
63 Swivel joint
64 Receiving element
66 Web
68 T-shaped groove
70 T-shaped end portion
72 Cover plate

The invention claimed is:

1. A vehicle roof, comprising:
a roof opening;
a planar, transparent or translucent, roof element that closes the roof opening;
a roof frame of the vehicle roof, the roof element being connected to the roof frame in a fixed manner;
an interior roof liner;
a ventilation device having a ventilation flap, the ventilation device being integrated in the roof element, wherein the ventilation flap is pivotable between a closed position, in which the ventilation flap closes a ventilation opening, and an open position, in which the ventilation flap opens the ventilation opening; and
a rotatable roller blind extendible relative to the vehicle roof, wherein at least one portion of the roller blind is equipped with an air-permeable net fabric to provide for air exchange between an environment external to the vehicle and an interior of the vehicle when the roller blind is extended relative to the vehicle roof;
wherein the roller bind is arranged between the roof liner and the roof element;
wherein the ventilation device is offset longitudinally in a direction of vehicle travel from an opening in the roof liner, and wherein an air exchange gap formed between the roof liner and the vehicle roof traverses the longitudinal offset, via which air exchange occurs between the environment external to the vehicle and the interior of the vehicle; and
wherein a wall separates the roller blind in a retracted position from the air exchange gap.

2. The vehicle roof according to claim 1, wherein
the ventilation flap is pivotable into the open position such that an edge of the ventilation flap is lowered below a roof surface of the vehicle roof.

3. The vehicle roof according to claim 1, wherein
the ventilation flap is pivotable such that the ventilation opening faces the roof element or faces away from the roof element.

4. The vehicle roof according to claim 1, wherein
the ventilation device is integrated in a cut-out in the roof element and/or in a cut-out in a screen.

5. The vehicle roof according to claim 1, wherein
the ventilation device has a drive, which drive is connected to the ventilation flap in order to pivot the ventilation flap between the closed position and the open position.

6. The vehicle roof according to claim 5, wherein the ventilation flap is coupled to the drive via a lever device.

7. The vehicle roof according to claim 1, wherein the ventilation flap has cover plates.

8. The vehicle roof according to claim 1, wherein the roof element comprises a glass panel.

9. A vehicle comprising a vehicle roof according to claim 1.

10. A vehicle roof, comprising:
a roof opening;
a planar, transparent or translucent, roof element that closes the roof opening;
a roof frame of the vehicle roof, the roof element being connected to the roof frame in a fixed manner;
a ventilation device having a ventilation flap, the ventilation device being integrated in the roof element, wherein
the ventilation flap is pivotable between a closed position, in which the ventilation flap closes a ventilation opening, and an open position, in which the ventilation flap opens the ventilation opening;
the ventilation device has a housing, within which the ventilation flap is mounted so as to be pivotable about a pivot axis, and
a water channel integrated internally within the housing is configured to conduct and discharge water from the housing.

11. The vehicle roof according to claim 10, wherein the ventilation flap is pivotable into the open position such that an edge of the ventilation flap is lowered below a roof surface of the vehicle roof.

12. The vehicle roof according to claim 10, wherein the ventilation flap is pivotable such that the ventilation opening faces the roof element or faces away from the roof element.

13. The vehicle roof according to claim 10, wherein the ventilation device is integrated in a cut-out in the roof element and/or in a cut-out in a screen.

14. The vehicle roof according to claim 10, wherein the ventilation device has a drive, which drive is connected to the ventilation flap in order to pivot the ventilation flap between the closed position and the open position.

15. The vehicle roof according to claim 10, wherein the ventilation flap is coupled to the drive via a lever device.

16. The vehicle roof according to claim 10, wherein the ventilation flap has cover plates.

17. The vehicle roof according to claim 10, wherein the roof element comprises a glass panel.

18. A vehicle comprising a vehicle roof according to claim 10.

19. The vehicle roof according to claim 1, wherein the ventilation flap is pivotable into the open position such that an edge of the ventilation flap is raised above a roof surface of the vehicle roof.

20. The vehicle roof according to claim 10, wherein the ventilation flap is pivotable into the open position such that an edge of the ventilation flap is raised above a roof surface of the vehicle roof.

* * * * *